May 17, 1927.
E. PRICE
ELECTROMAGNETIC CLUTCH
Filed Aug. 28, 1925
1,629,304
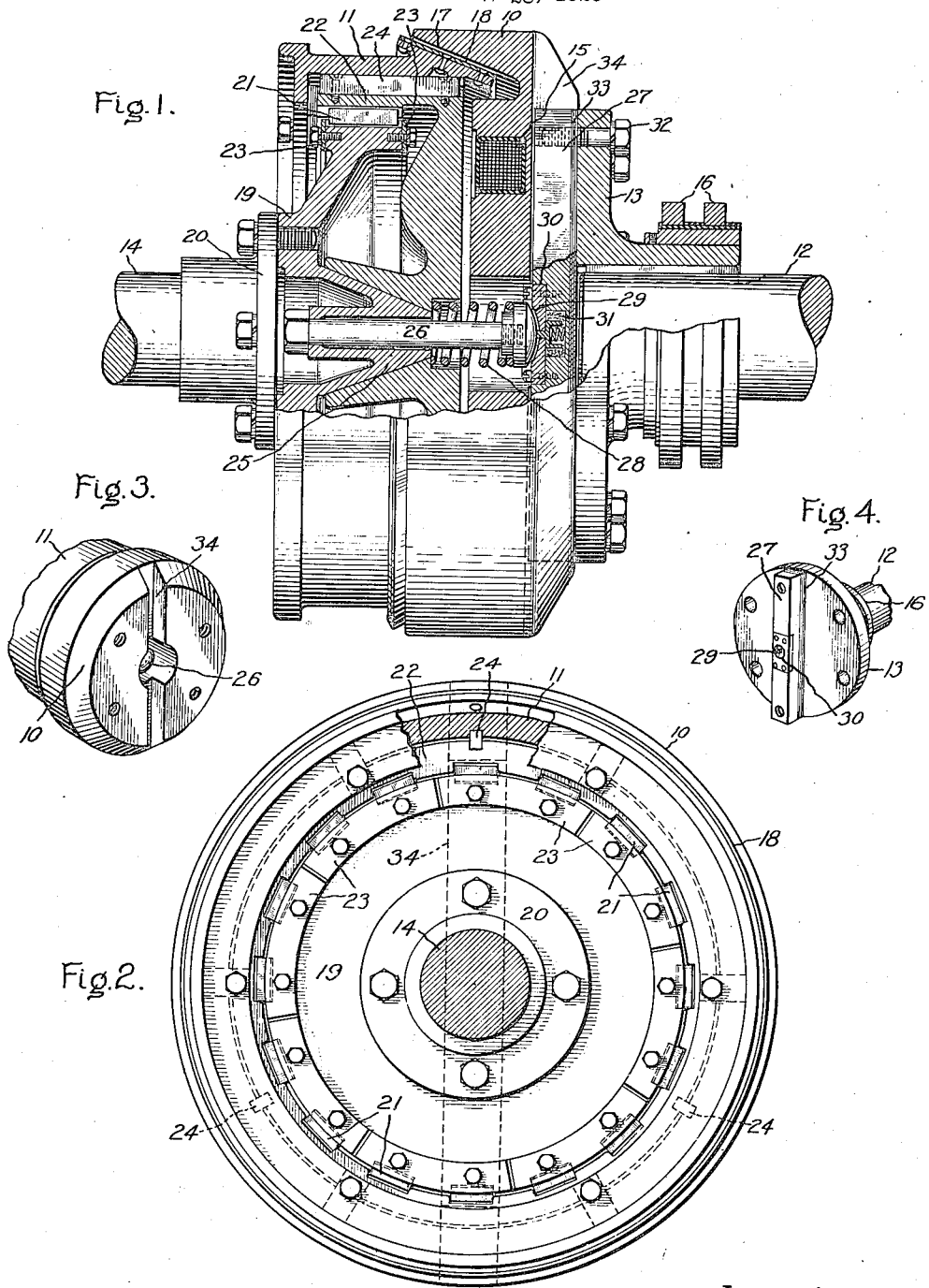
Inventor:
Edgar Price,
by
His Attorney.

Patented May 17, 1927.

1,629,304

UNITED STATES PATENT OFFICE.

EDGAR PRICE, OF SCHENECTADY, NEW YORK, ASSIGNOR TO GENERAL ELECTRIC COMPANY, A CORPORATION OF NEW YORK.

ELECTROMAGNETIC CLUTCH.

Application filed August 28, 1925. Serial No. 53,191.

My invention relates to improvements in the construction and arrangement of electromagnetic clutches.

One of the objects of the invention is to provide an electromagnetic clutch which shall serve also as a flexible coupling between two shafts, the flexible coupling to be integral with the clutch parts.

Another object of the invention is the provision of a clutch which shall be so arranged that the cooperating clutch parts will readily align themselves with each other. Suitable bearing surfaces are provided to take care of the friction between cooperating clutch members at their axis of rotation during clutching operation, the said bearing surfaces being readily accessible for inspection without disassembling the clutch.

A still further object of the invention is the provision of means for holding the clutch and flexible coupling parts in their proper respective positions when the winding of the clutch electromagnet is deenergized.

These and other objects of the invention as will be either apparent to those skilled in the art or as will be pointed out particularly hereinafter are attained in the electromagnetic clutch and flexible coupling shown in the accompanying drawing which I now consider to represent the preferred form of the invention.

Referring to the drawing, Fig. 1 is a plan view of the clutch and flexible coupling, certain of the parts being shown in section for the purpose of explaining the invention, Fig. 2 is a plan view of the left hand end of the construction shown in Fig. 1, and Figs. 3 and 4 show details of the bearing surface assembly and driving connection, these parts being shown to a smaller scale than the similar parts shown in Fig. 1.

The electromagnetic clutch and coupling comprises the two cooperating frictionally engaging relatively movable clutch parts 10 and 11, the clutch part 10 being arranged to be secured to the end of the shaft 12 by means of the flange coupling 13 and the clutch part 11 being arranged to be connected with the end of the shaft 14 through the flexible coupling to be hereinafter described. The clutch part 10 carries the winding 15 of the operating electromagnet, this winding being supplied with current through the slip rings 16. The clutch part 10 has a bevel surface 17 which cooperates with a corresponding inclined surface on the clutch part 11, the inclined surface of the clutch part 11 being provided with a facing 18 of any suitable wear resisting material.

The clutch part 11 is connected with the supporting member 19, which is arranged to be secured to the end of the shaft 14 through the half flange coupling 20, which is secured to the shaft. A flexible driving connection is provided between the clutch part 11 and the supporting member 19 through the keys 21, a plurality of which are disposed about the periphery of the supporting member 19. These resilient connecting devices 21 may be of any suitable material, such as leather, rubber, or the like, and as shown, these devices are in the form of oblong pads which fit in suitable slots cut in the inner surface of the rim of the armature 22, and are carried in suitable slots in the periphery of the supporting member 19. These connecting devices are held in position in any suitable manner and I have indicated the devices as held in position by means of the sectors 23, which are bolted to the rim of the supporting member 19.

The armature 22 is keyed to the clutch part 11 by means of a suitable number of keys 24, as indicated, so that to all practical purposes the armature and clutch part 11 form a unitary clutch part. The friction surface rim 11 and the armature 22 of this unitary clutch part are made separately, as indicated, for convenience and economy of manufacture and assembly. However, when the friction rim 11 and the armature 22 are assembled, as shown, these parts function as a unit.

The supporting member 19 has a conical axially disposed portion 25 which cooperates with a conical surface of the armature 22 for the purpose of centering the clutch part 11 with reference to the axis of the shaft 14. The centering pin 26 has one end thereof secured to this conical portion of the supporting member 19 and the pin 26 is mounted at the axis of the shaft 14. The other end of the pin projects toward the clutch part 10 and this free end of the pin has a rounded bearing surface which cooperates with a corresponding surface of the removable bearing member 27. The spring 28 mounted on the bearing pin 26 is arranged to press against the armature 22 so as to force the conical centering surfaces of the armature and the conical portion 25 of the support 19 so as to maintain the clutch part 11 in proper axial alignment when the winding of the operating electromagnet is deenergized and the clutch is opened. This spring also serves the purpose of effecting a separation of the engaging clutch parts upon the deenergization of the electromagnet.

In Fig. 4 I have shown on a reduced scale the arrangement of the removable bearing member 27 which cooperates with the rounded end of the centering pin 26 of Figs. 1 and 3. This bearing member 27 is provided with a lubricated cup-shaped bearing surface 29 which is formed in a bearing member 30 of any suitable bearing material. A lubrication of the bearing surfaces is provided through the wick 31 which is carried in a suitable aperture in the bearing member 27, and the arrangement is such that when this wick is saturated with oil, the bearing surfaces will be kept properly lubricated for a considerable length of time. At definite periods of the operation of the clutch it is desirable to renew the supply of oil and also to inspect the bearing surfaces, and the bearing member 27 is therefore made removable. This bearing member may be removed by simply removing the securing bolts 32 and then pressing out the shims 33 so that the bearing member 27 will clear the end of the bearing pin 26. It will be noted that the bearing member 27 is carried in the slot 34 cut in the clutch member 10, so that the removal of this bearing member and the inspection of the bearing surfaces may be had without disassembling the clutch. The backing shims 33 provide a convenient means for adjusting the distance between the rounded end of the pin 26 and the cup shaped bearing surface 29.

As thus constructed and arranged and with the parts in their respective positions as shown in Fig. 1, the operation of my invention is as follows: When the winding 15 of the operating electromagnet is energized, the friction rim clutch part 11 and the armature 22 move as a unit toward the clutch part 10 by reason of the magnetic pull on the armature 22 tending to close the air gap between this armature and the magnetic structure in which the winding 15 is embedded. The clutch rim 11 and the armature 22 move axially with relation to the supporting member 19 by reason of the axial movement between these parts permitted by the construction and arrangement of the resilient connecting devices 21 as previously described. The friction surface 18 of the clutch part 11 is thus brought into engagement with the clutch surface 17 of the clutch part 10, so that the shafts 12 and 14 are coupled together. The resilient connecting devices 21 take up the shock of the engagement of the clutch and the construction is such that a flexible coupling as well as a clutch is thus secured. When the armature 22 is moved to the attracted position, the spring 28 is compressed, and when the winding 15 is subsequently deenergized, the strain of this spring is present to effect the separation of the friction surfaces 17 and 18 and the disengagement of the clutch parts and also to force the conical surface of the armature 22 on the conical centering portion 25 of the supporting member 19 so that the clutch part 11 is maintained accurately in proper position with reference to the axis of the shaft 14.

In the manufacture of electromagnetic clutches it is very difficult to avoid slight misalignment of the clutch parts and this slight misalignment is taken care of during engagement and during the clutching operation in my construction by means including the centering pin 26 and the removable bearing member 27 disposed at the axis of the clutch. The previously described flexible coupling also takes care of this misalignment. In case there is any relative radial movement of the clutch parts, this will ordinarily be comparatively small and this movement is taken care of at the lubricated bearing surfaces and through the flexible coupling. Since all of the members of the clutch rotate when the winding 15 is energized, there will of course be a certain amount of sliding motion at the engaging surfaces of the rounded end of the pin 26 and the cup shaped bearing surface 29 when the centers of the two clutch parts are out of line slightly. Since a lubricated bearing surface is provided at this point, the slight amount of misalignment is completely taken care of.

What I claim as new and desire to secure by Letters Patent of the United States is:—

1. The combination in an electromagnetic clutch, of a pair of relatively movable frictional engaging clutch parts, a support for one of said clutch parts arranged for connection with the end of a shaft, the said clutch part and said support having corresponding slots in adjacent surfaces thereof, keys of resilient material disposed in said slots for forming a flexible coupling between said shaft and the shaft to which the other clutch part is arranged to be connected, said keys and slots forming a connection between said first clutch part and said support which permits movement of said first clutch part into engaging and disengaging relation with the second of said clutch parts, the said support and the first of said clutch parts having axially disposed conical engaging surfaces for centering the said first clutch part with reference to said support upon disengagement of the clutch, and resilient means for holding the said conical surfaces in engaging relation.

2. The combination in an electromagnetic clutch, of a pair of cooperating relatively movable frictionally engaging clutch parts rotatable about a common axis, a bearing pin disposed at the said axis, associated with one of said clutch parts, and having a free end extending toward the other of said clutch parts, and a removable bearing member associated with the other of said clutch parts and having a lubricated bearing surface cooperating with the said free end of said pin for taking care of minor inaccuracies of alignment of said clutch parts.

3. The combination in an electromagnetic clutch, of a pair of cooperating relatively movable frictionally engaging clutch parts each of which is arranged for connection with the end of a separate shaft to clutch the shafts together, a support for one of said clutch parts, the said support being arranged to be secured to the end of one of said shafts, a bearing pin secured to said support at the axis thereof and having a free end extending toward the other of said clutch parts, and a removable bearing member associated with said other clutch part, the said member having a bearing surface disposed at the axis of said other clutch part for cooperation with the free end of said pin to take care of minor inaccuracies of alignment of said clutch parts.

4. The combination in an electromagnetic clutch, of a pair of cooperating relatively movable frictionally engaging clutch parts, a support for one of said parts arranged for connection with the end of a shaft, a resilient connection between said support and said clutch parts, the said support having a conical portion at the axis thereof, a bearing pin having one end thereof secured in said conical portion at the axis of said clutch part and the free end thereof extending toward the other of said clutch parts, the said clutch part having a portion which cooperates with the said conical portion of said support, a spring mounted on said pin for resiliently holding the said clutch part on the said conical portion of said support, and a removable bearing member secured in the other of said clutch parts, the said bearing member having a lubricated bearing surface which cooperates with the said free end of said pin to take care of minor inaccuracies of alignment of said clutch parts.

5. The combination in an electromagnetic clutch, of a pair of relatively movable frictionally engaging clutch parts, a support for the first of said parts, a resilient driving connection between said support and said first clutch part arranged to permit movement of said part into engaging and disengaging relation with the second of said clutch parts, an axially disposed conical portion of said support, the first of said parts having a conical surface which engages with the said conical portion to center the said part with reference to said support upon the disengagement of the clutch, a bearing pin having one end secured to said support at the axis thereof and the free end thereof extending toward said second clutch part, a spring mounted on said pin for resiliently holding the conical surfaces of said support and the first of said clutch parts in engaging relation, and a removable bearing member secured to said second clutch part, the said member having a lubricated bearing surface which cooperates with said free end of said pin to take care of minor inaccuracies of alignment of said clutch parts.

In witness whereof, I have hereunto set my hand this 27th day of August, 1925.

EDGAR PRICE.